US009506413B2

(12) United States Patent
Gibson et al.

(10) Patent No.: US 9,506,413 B2
(45) Date of Patent: Nov. 29, 2016

(54) METHOD AND SYSTEM FOR ENGINE STARTING

(71) Applicant: Ford Global Technologies, LLC, Dearborn, MI (US)

(72) Inventors: Alexander O'Connor Gibson, Ann Arbor, MI (US); Steven Wooldridge, Saline, MI (US); David Bruce Reiche, Livonia, MI (US); Brad Alan VanDerWege, Plymouth, MI (US); Ethan D. Sanborn, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/182,492

(22) Filed: Jun. 14, 2016

(65) Prior Publication Data

US 2016/0290263 A1 Oct. 6, 2016

Related U.S. Application Data

(62) Division of application No. 14/162,454, filed on Jan. 23, 2014, now Pat. No. 9,382,864.

(51) Int. Cl.

| | |
|---|---|
| ***B60T 7/12*** | (2006.01) |
| ***F02D 41/06*** | (2006.01) |
| ***F02D 41/30*** | (2006.01) |
| ***F02M 61/14*** | (2006.01) |

(52) U.S. Cl.
CPC ............. *F02D 41/062* (2013.01); *F02D 41/30* (2013.01); *F02M 61/145* (2013.01)

(58) Field of Classification Search
CPC ... F02D 41/401; F02D 41/062; F02D 41/065
USPC ......... 701/103–105; 123/434, 673, 478, 480, 123/491, 590
See application file for complete search history.

(56) References Cited

U.S. PATENT DOCUMENTS

| | | | | |
|---|---|---|---|---|
| 6,223,730 | B1 * | 5/2001 | Hasegawa ............. | F02D 41/047 123/491 |
| 6,931,840 | B2 | 8/2005 | Strayer et al. | |
| 7,069,909 | B2 | 7/2006 | Pozar et al. | |
| 7,107,965 | B2 | 9/2006 | Pozar et al. | |
| 7,124,743 | B2 | 10/2006 | Gonzales, Jr. et al. | |
| 7,520,260 | B2 | 4/2009 | Nakamura et al. | |
| 2003/0037771 | A1 | 2/2003 | Yuya et al. | |
| 2013/0152903 | A1 * | 6/2013 | Leone ................... | F02D 41/062 123/491 |
| 2014/0278005 | A1 | 9/2014 | Gibson et al. | |
| 2015/0025780 | A1 | 1/2015 | Gibson et al. | |
| 2015/0219036 | A1 | 8/2015 | Gibson et al. | |

* cited by examiner

*Primary Examiner* — John Kwon

(74) *Attorney, Agent, or Firm* — Julia Voutyras; Alleman Hall McCoy Russell & Tuttle LLP

(57) ABSTRACT

A method and system for improving starting of an engine is presented. In one example, the method selects a first cylinder to receive fuel since engine stop based on intake valve closing time. The method also describes selecting the first cylinder to receive fuel since engine stop based on an end of fuel injection time.

6 Claims, 4 Drawing Sheets

METHOD AND SYSTEM FOR ENGINE STARTING

CROSS REFERENCE TO RELATED APPLICATIONS

The present application is a divisional of U.S. patent application Ser. No. 14/162,454, entitled "METHOD AND SYSTEM FOR ENGINE STARTING," filed on Jan. 23, 2014, the entire contents of which are hereby incorporated by reference for all purposes.

FIELD

The present description relates to methods and systems for improving starting of an engine. The method may be particularly useful for engines that are operated using different types of fuels.

BACKGROUND AND SUMMARY

It may be desirable from a driver's standpoint to make an engine run-up to idle speed as soon as possible after the driver requests an engine start. On the other hand, running-up the engine to idle speed as fast as possible may increase engine emissions. Therefore, it may be desirable to provide an engine run-up that produces low emissions while at the same time not extending the run-up time so as to disappoint the driver. However, injecting fuel to an arbitrary engine cylinder or all engine cylinders at the same time may provide somewhat desirable engine starting results at times while producing disappointing engine starting results at other times.

The inventors herein have recognized the above-mentioned disadvantages and have developed a method for starting an engine, comprising: selecting a cylinder of an engine to receive a first port injection of fuel to the engine since engine stop in response to an intake valve of the cylinder being open and a position of the engine allowing end of fuel injection to the cylinder a predetermined number of crankshaft degrees before intake valve closing of the cylinder.

By selecting a cylinder of an engine for a first fuel injection event since engine stop in response to an intake valve of the cylinder being open and a position of the engine allowing fuel injection to the cylinder a predetermined number of crankshaft degrees before intake valve closing of the cylinder, it may be possible to provide the technical result of reducing engine emissions and engine cranking time. For example, fuel may be injected to a cylinder if the fuel injection may be completed early enough to allow a desired amount of evaporated fuel and/or liquid fuel to enter the cylinder. Otherwise, fuel may be injected to a different cylinder after the engine has rotated to a position where the desired amount of evaporated fuel may enter the cylinder.

The present description may provide several advantages. For example, the approach may improve engine starting consistency by reducing the possibility of engine misfire. In addition, the approach may improve engine starting emissions by avoiding arbitrary fueling of engine cylinders. Further, the approach may improve a driver's perception of engine starting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
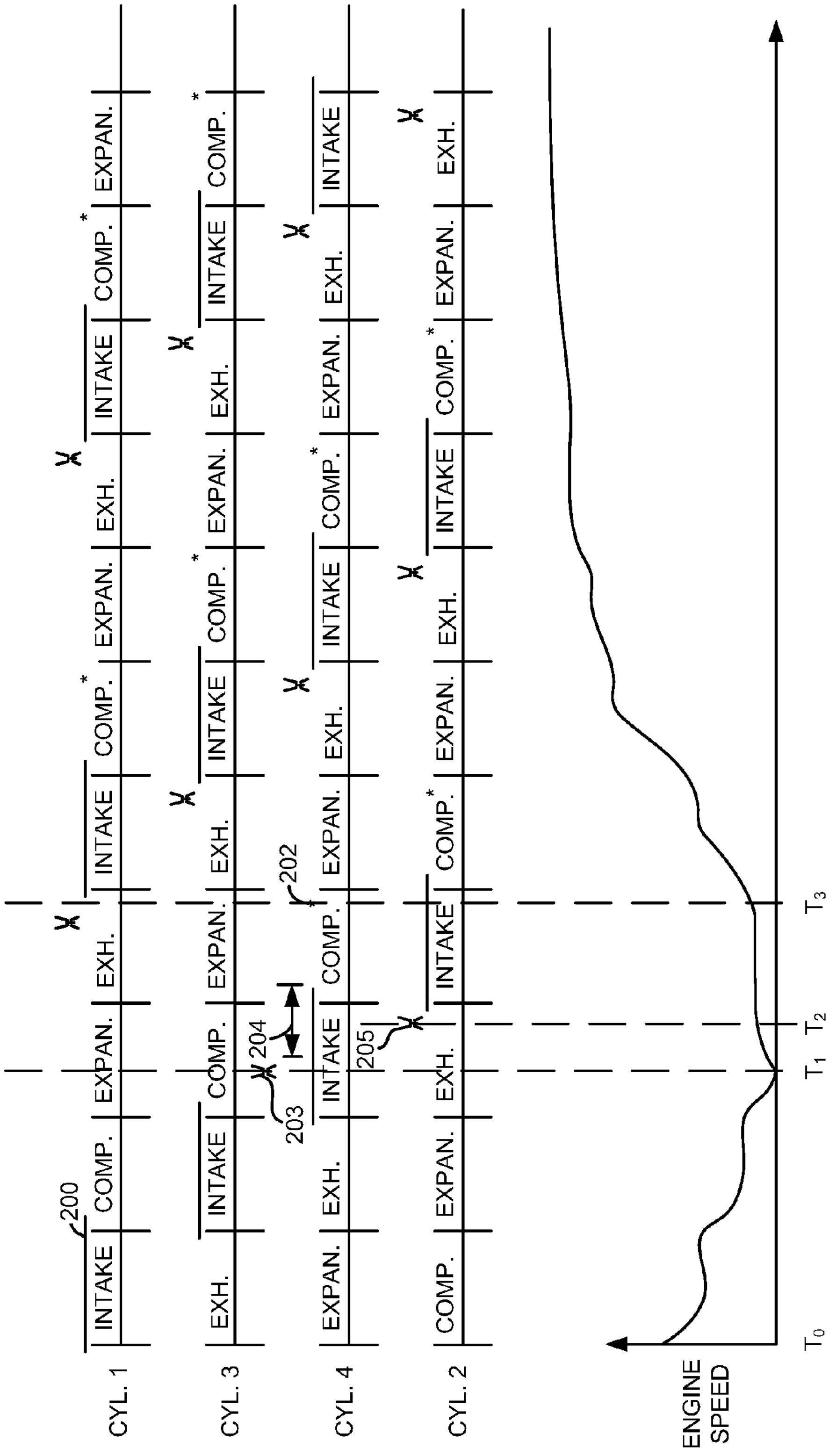
FIGS. 2 and 3 show example engine starting sequences.
Figure 3:
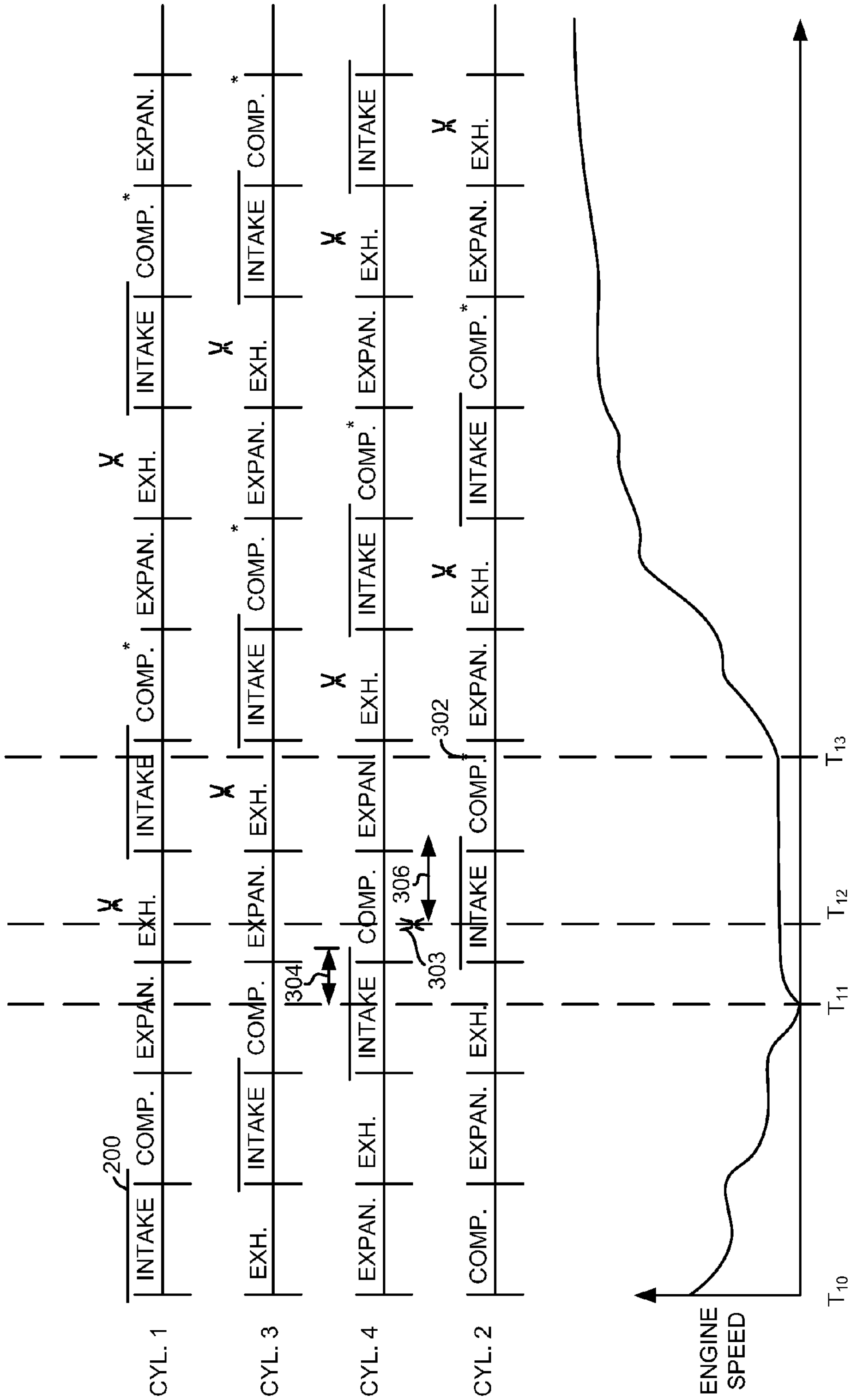
Figure 4:
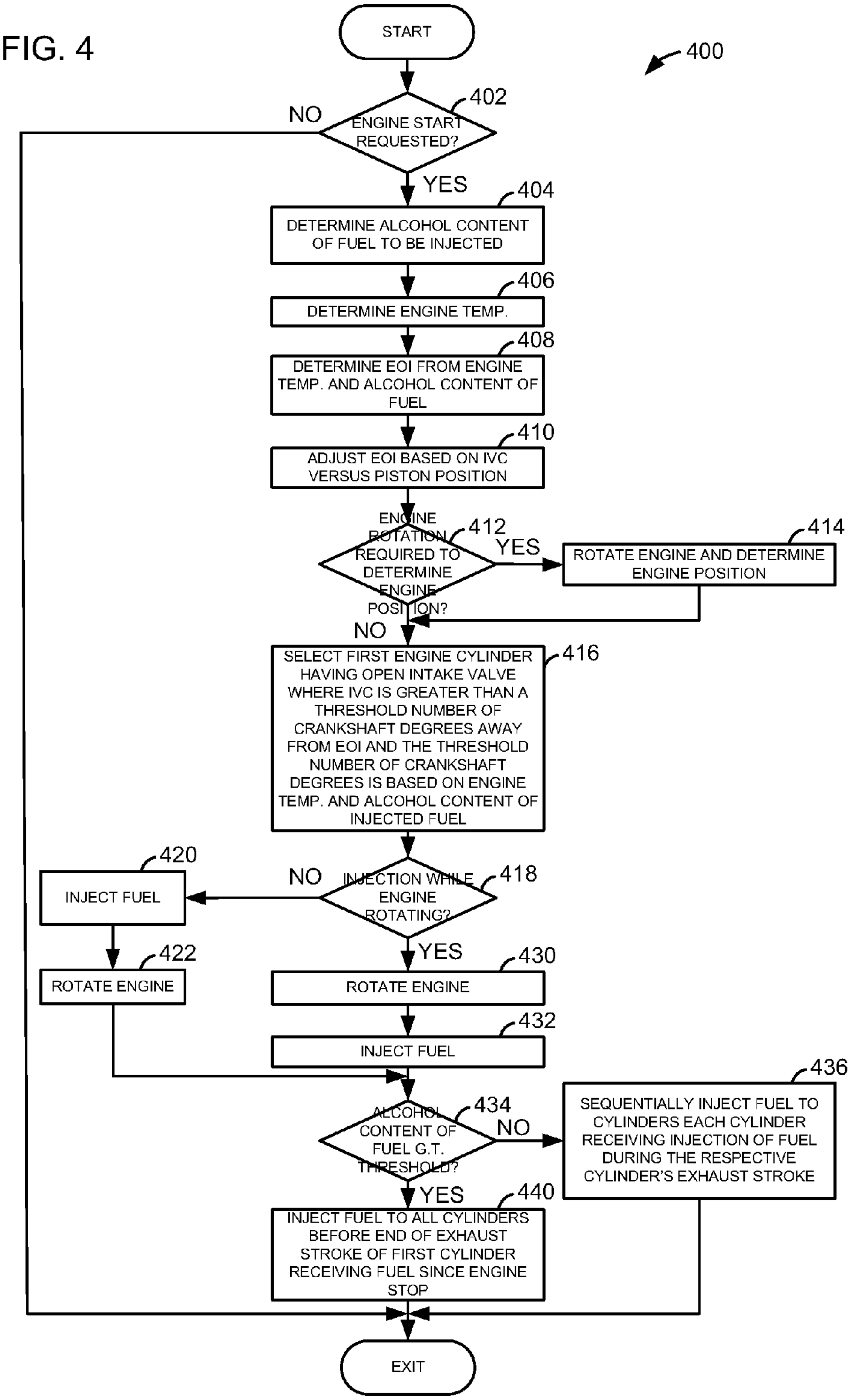
FIG. 4 is a flowchart of an example method for starting an engine.

The present description is related to starting an engine. The methods described herein may be applied during warm or cold engine starts. Further, the methods and systems described herein are applicable to engines that operate solely on petrol, alcohol, or mixtures of petrol and alcohol. FIGS. 2 and 3 show example engine starting sequences according to the method described in FIG. 4. The method of FIG. 4 provides for beginning to inject fuel to a cylinder while the cylinder's intake valve is open.

Figure 1:
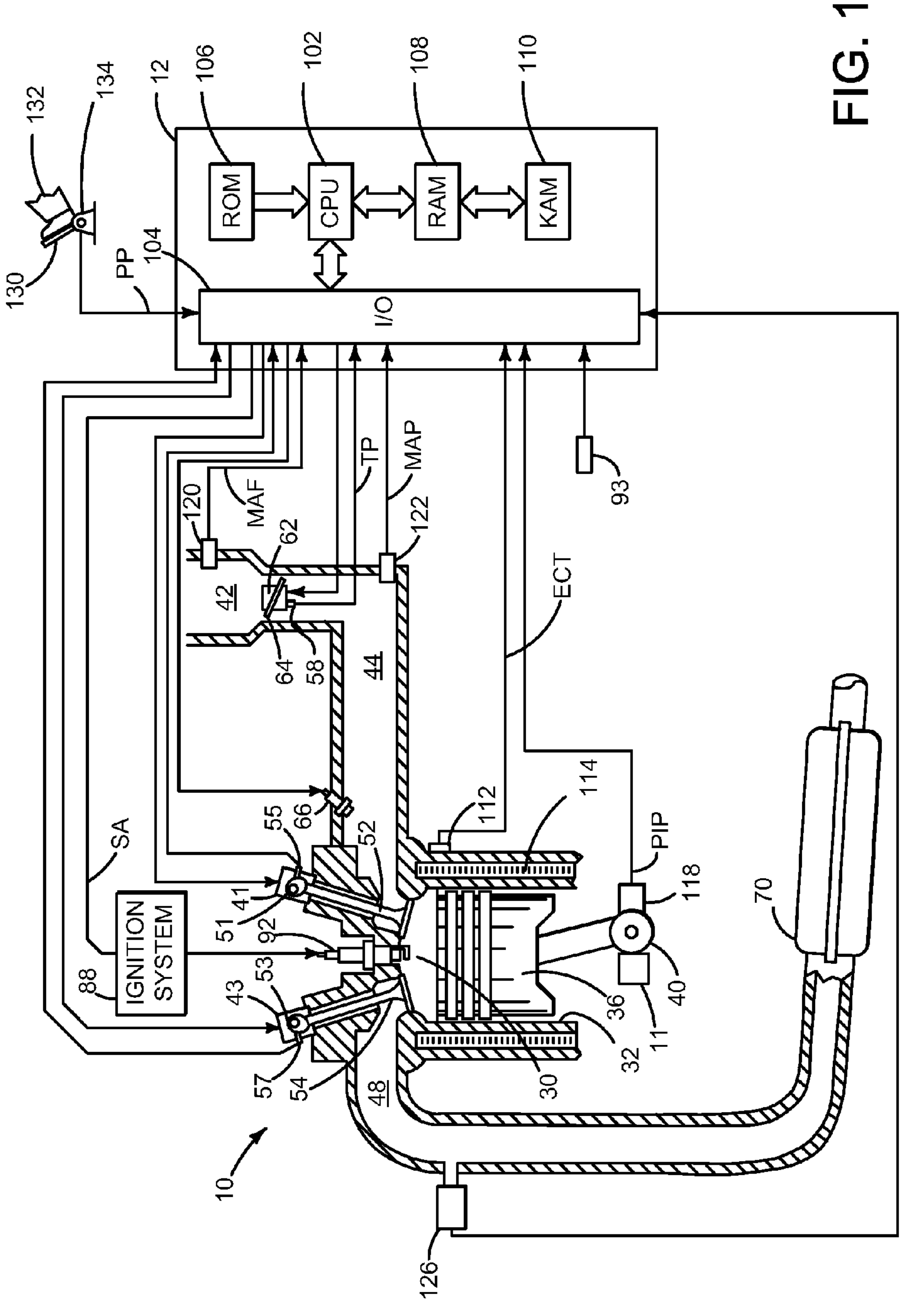
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Starter motor 11 may selectively engage and rotate crankshaft 40 during engine starting. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Intake valve timing (e.g., opening and closing) may be moved relative to a position of crankshaft 40 via cam indexing device 41. Exhaust valve timing (e.g., opening and closing) may be moved relative to a position of crankshaft 40 via cam indexing device 43.

Fuel injector 66 is shown positioned to inject fuel into cylinder 30, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed via sensor 93 for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a V configuration engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for an engine system, comprising: an engine including a cylinder; a port fuel injector positioned to supply fuel to the cylinder; and a controller including non-transitory instructions for selecting a cylinder for a first combustion event in the cylinder since engine stop in response to an end of fuel injection timing and an intake valve closing time. The engine system includes where the end of fuel injection timing is based on an alcohol content of fuel injected to the engine. The engine system includes where the end of fuel injection timing is based on engine temperature. The engine system also includes where instructions to select the cylinder are in further response to a number of crankshaft degrees between the end of fuel injection timing and the intake valve closing time being greater than a threshold number of crankshaft degrees. The engine system further comprises additional instructions for adjusting the threshold number of crankshaft degrees in response to alcohol content of fuel being injected to the engine. The engine system further comprises additional instructions for adjusting the threshold number of crankshaft degrees in response to engine temperature, manifold absolute pressure (MAP), and crankshaft speed.

Referring now to FIG. 2, a first example of a simulated engine starting sequence is shown. The sequence of FIG. 2 may be provided by the method of FIG. 4 in the system of FIG. 1. Vertical markers at times T1 and T2 show times of interest during the sequence.

FIG. 2. includes four plots of cylinder strokes for a four cylinder engine having a firing order of 1-3-4-2. The cylinder strokes of cylinder number one are in the plot that has a Y axis labeled CYL 1. Likewise, cylinder strokes for the remaining cylinders 2-4 are similarly labeled. The X axis represents engine position during an engine starting sequence. The amount of time for the engine to proceed through each stroke varies with engine speed, but the stroke intervals (e.g., 180 crankshaft degrees) are always the same. Thus, the time interval may be longer for the first couple of cylinder strokes during engine cranking, but the time between cylinder strokes decreases as engine speed increases. The X axis of each cylinder's stroke is labeled to designate the present stroke each cylinder is on at a point in time. For example, the sequence begins on the left side of the figure with cylinder number one on an intake stroke and proceeds to the right side of the figure. At the same time, cylinder number three is on an exhaust stroke, cylinder number four is on an expansion stroke, and cylinder number two is on a compression stroke.

Intake valve opening timings for each of the four cylinders are indicated by the wide lines above each cylinder stroke. For example, line 200 represents intake valve opening time for cylinder number one. The intake valve opens near top-dead-center intake stroke and closes after bottom-dead-center compression stroke. Similar valve timings are shown for cylinders 2-4. Spark timing for each cylinder is represented by an * such as is shown at 202. End of fuel injection (EOI) times are indicated by the symbol labeled 203.

The fifth plot from the top of FIG. 2 shows engine speed versus engine position. The Y axis represents engine speed and engine speed increases in the direction of the Y axis arrow. The X axis represents engine position and the engine position is the same engine position as is shown for plots 1-4.

The sequence begins at time T0 where the engine is decelerating to zero speed. The engine may stop in response to a driver's request or in response to an automatic engine shutdown instituted by a controller. Fuel and spark are not provided to the engine cylinders as the engine speed is reduced to zero at time T1. The engine speed decays from time T0 to time T1 and the intake valves of the respective cylinders continue to operate. The engine position may be tracked as engine speed goes to zero so that engine position is known at engine starting time.

At time T1, the engine comes to a full stop and waits for an engine start request. The engine may be stopped at time T1 for a short or long period of time; however, the duration of time the engine is stopped is not reflected in the X axis of any of the five plots since the X axis of each plot is based on engine position. The engine start request may be initiated via a driver or a controller that automatically starts the engine without the driver providing input to a device that has a sole purpose of starting and/or stopping the engine (e.g., an ignition switch).

Upon receiving an engine start request, fuel is injected to cylinder four while cylinder number four is on an intake stroke and while the intake valve of cylinder number four is open. In this example, the fuel is injected to the cylinder's port at 203 and fuel injection is complete before the engine starts to rotate in response to the engine start request. The engine begins to rotate via the starter after the first fuel injection event is complete. The fuel injected at 203 is for a first combustion event since engine stop. Fuel is injected to cylinder number four for a first time since the engine stopped at time T1 because the intake valve of cylinder number four is open and because end of fuel injection time to the cylinder is greater than a predetermined number of crankshaft degrees of rotation before intake valve closing (IVC) time. The predetermined number of crankshaft degrees is less than the number of crankshaft degrees shown at 204. The predetermined number of crankshaft degrees shown at 204 may be adjusted in response to engine temperature, speed, MAP and the amount of alcohol in the fuel injected to the cylinder.

At time T2, the end of a second fuel injection being performed since engine stop occurs. Fuel is injected to the port of cylinder number two. Thus, the engine is started by sequentially providing fuel to each cylinder according to the firing order of the engine. The second fuel injection and subsequent fuel injections to other cylinders take place during the time when intake valves of the cylinder receiving fuel are closed. By injecting fuel to cylinder intake ports while intake valves of the cylinder receiving fuel are closed (e.g., during the cylinder's exhaust stroke) after a first open valve injection of fuel, the injected fuel may have more time to evaporate and mixing of air and fuel may be improved since mixture velocity across the intake valve during intake valve opening may be high. Consequently, engine run-up and emissions may be improved. The engine rotates at cranking speed at time T2.

At time T3, the first fuel injection at 203 is ignited by a spark and the engine begins to accelerate. Fuel injection for the second combustion event of cylinder number four since engine stop is during a time of a closed intake valve of cylinder number four. Thus, cylinder number four transitions from open valve injection to closed valve injection. The open valve injection may reduce engine starting time and the closed valve injection may improve engine emissions. Injection to each of the other cylinders is closed valve sequential fuel injection according to the engine firing order after time T3.

Thus, if the engine stops at a location where fuel may be injected to a cylinder having an open intake valve and the fuel injection for the first combustion event may be stopped before the engine is within a predetermined number of crankshaft degrees before IVC of the cylinder receiving the fuel, fuel is injected to the cylinder that is at a predetermined number of crankshaft degrees before IVC. By injecting fuel to an open valve, engine starting time may be reduced, and injecting fuel to an open intake valve that is a predetermined number of crankshaft degrees from IVC allows injected fuel to evaporate, thereby reducing the possibility of engine misfire.

Referring now to FIG. 3, a second example engine starting sequence is provided. The engine starting sequence in FIG. 3 is similar to the starting sequence in FIG. 2. Further, the plots of FIG. 3 are similar to the plots of FIG. 2. Therefore, a description of the individual plots of FIG. 3 is omitted for the sake of brevity and the description in FIG. 2 applies to FIG. 3 except as indicated below. The sequence of FIG. 3 may also be performed by the method of FIG. 4 in the system of FIG. 1.

At time T10 the engine is decelerating toward zero speed. The engine is decelerating in response to a request to stop the engine. Spark and fuel supplied to the engine cylinders is deactivated while the engine is decelerating. The engine fully stops at time T11.

At time T11 the engine is stopped until a request for an engine start is made. The engine stop time may be a long or short duration. In some examples, the engine is automatically started without a driver activating an ignition switch. The engine is stopped at a location where the intake valve opening duration 304 before IVC is less than a threshold duration. In other words, the number of crankshaft degrees between the engine stopping position and IVC for cylinder number four is less than a threshold number of crankshaft degrees. The other engine cylinders do not have an open intake valve at time T11.

An engine start request is received after the engine has been stopped, and the engine begins to rotate via the engine's starter. Fuel is not injected to the intake port of cylinder number four because the engine was stopped at less than a predetermined number of crankshaft degrees before IVC of cylinder number four. If fuel were to have been injected to the intake port of cylinder number four while the intake valve was open, the engine may have misfired because less than a desired amount of injected fuel may have entered the cylinder because EOI would be less than a predetermined number of crankshaft degrees before IVC. Therefore, injection of fuel into the port of cylinder number four is avoided for a first combustion event since engine stop.

At time T12, a first fuel injection since engine stop ends. Fuel is injected to an open valve of cylinder number two since cylinder number two is the first engine cylinder where EOI is possible while an intake valve of the cylinder receiving fuel is open and where EOI is greater than a predetermined number of crankshaft degrees away from IVC of the cylinder receiving fuel. The second fuel injection since engine stop is made to cylinder number one during a time when the intake valve of cylinder number one is closed. Fuel is sequentially injected to the other cylinders based on the engine combustion order while intake valves of the cylinders receiving fuel are closed.

At time T13, a spark is supplied to cylinder number two and the first injected fuel amount since engine stop is combusted. The spark initiates the combustion event and engine speed accelerates from cranking speed in response to combustion within cylinder number two. The engine runs up to idle speed after the first combustion event.

Thus, if the engine stops at a position where EOI for a cylinder having an open intake valve is or would be less than a predetermined number of crankshaft degrees before IVC, fuel is injected to an open valve of a cylinder next in the engine's firing order. The fuel is injected at a time where EOI for the cylinder receiving the fuel is greater than a predetermined number of crankshaft degrees before IVC while the intake valve of the cylinder receiving the fuel is open. In this way, it is possible to inject fuel to a cylinder having an open intake valve before EOI is less than a predetermined number of crankshaft degrees from IVC.

Referring now to FIG. 4, a method for starting a stopped engine is shown. The method of FIG. 4 may be applied to the system of FIG. 1. The method of FIG. 4 may provide the operating sequences shown in FIGS. 2 and 3. Additionally, the method of FIG. 4 may be stored as executable instructions in memory of a controller as shown in FIG. 1.

At 402, method 400 judges whether or not an engine start is requested. An engine start may be requested via a driver operating an ignition switch or pushbutton. Alternatively, an engine start may be requested by a controller that automatically restarts the engine in response to vehicle operating conditions. If method 400 determines that an engine starting request is present, method 400 proceeds to 404. Otherwise, method 400 proceeds to exit.

At 404, method 400 determines an alcohol content of fuel being injected to the engine via a port injector. The alcohol content of fuel may be determined via a fuel sensor or an exhaust oxygen sensor and an amount of fuel injected to the engine. In some examples, the alcohol content of fuel being injected may be determined before the engine is stopped. The determined alcohol content may be stored to memory where it may be retrieved during the engine start. Method 400 proceeds to 406 after the fuel's alcohol content is determined.

At 406, method 400 determines engine temperature. Engine temperature may be determined from engine coolant temperature or from temperature of an engine cylinder head. The engine temperature provides an indication as to whether or not injected fuel will vaporize to a desired extent in the engine's cylinder port during engine starting. Method 400 proceeds to 408 after engine temperature is determined.

At 408, method 400 determines a desired EOI based on the engine temperature, MAP, and the alcohol content of fuel being injected to the engine. EOI is determined from engine temperature, MAP, and the alcohol content of the fuel being injected because engine temperature, MAP, and alcohol content of the fuel affect air charge and fuel vaporization, thereby affecting the desired fuel mass and the amount of fuel that may enter the cylinder before IVC.

In one example, EOI is empirically determined via performing engine starts where EOI is adjusted responsive to alcohol content of the fuel and engine coolant temperature. The number of crankshaft degrees between EOI and IVC of the cylinder receiving the fuel is increased as the alcohol content of the injected fuel increases since alcohol may not vaporize as well as petrol. Also, the injection pulse width may increased as the alcohol fraction increases. In some cases, the EOI to IVC spacing is increased and the injection pulse width is simultaneously increased as the alcohol fraction increases. In other cases, only EOI or the pulse width is varied. On the other hand, the number of crankshaft degrees between EOI and IVC of the cylinder receiving the fuel is decreased as the alcohol content of the fuel decreases. Similarly, the number of crankshaft degrees between EOI and IVC of the cylinder receiving the fuel is increased and the fuel injection pulse width may be increased as the engine temperature decreases since fuel may not vaporize, for a given alcohol fraction, as well as desired at lower engine temperatures. The number of crankshaft degrees between EOI and IVC and the injection pulse width of the cylinder receiving the fuel is decreased as the engine temperature increases since fuel may vaporize well at higher engine temperatures. In one example, a base EOI and fuel pulse width for a first cylinder receiving fuel since engine stop is a predetermined number of crankshaft degrees before IVC. The base EOI and pulse width are based on petrol injection to the engine at 20° C. Engine coolant temperature and the fuel's alcohol content index tables that provide adders or multipliers that modify the base EOI and fuel pulse width. The base EOI and pulse width value are adjusted and method 400 proceeds to 410.

At 410, method 400 adjusts the EOI and fuel pulse width (as IVC effects trapped air charge) based on the piston position relative to IVC for the cylinder receiving a first fuel injection since engine stop. In some examples, IVC may be adjusted to different positions relative to crankshaft position during engine starting based on engine temperature, alcohol content of fuel injected, and other conditions. Consequently, the engine position of IVC relative to piston position may vary. The piston position at engine stop relative to top-dead-center intake stroke and IVC, or alternatively, relative to bottom-dead-center intake stroke and IVC, may be the basis for further adjusting EOI and fuel pulse width. For example, if IVC is retarded (e.g., moved closed to TDC) later than bottom dead center intake stroke where the piston begins compressing cylinder contents, EOI may be held to a predetermined number of crankshaft degrees before bottom-dead-center intake stroke rather than relative to IVC. On the other hand, if IVC is advanced (e.g., moved closer to BDC), EOI may be advanced a same or different number of degrees. Advancing EOI relative to IVC, i.e. increasing the crank angle spacing between EOI and IVC, may allow fuel to vaporize more thoroughly before IVC. If IVC is retarded from bottom-dead-center intake stroke, EOI may be retarded further as EOI to IVC crank angle spacing will have increased for a fixed EOI timing. If IVC is advanced from bottom-dead-center intake stroke, the EOI may be advanced a similar number of degrees to maintain a similar EOI to IVC spacing. On some engines or combustion chambers at engine cranking speed, the EOI to BDC spacing may determine the open valve injection fraction of fuel injected to fuel transferred from the port to the cylinder as a function of ECT and fuel type during a stop/start restart. On other engines, the EOI to IVC spacing may be more dominant. In one example, adjustments to EOI are empirically determined and stored to memory in tables or functions. The tables and/or functions are indexed using IVC in crankshaft degrees. The tables output an adder or multiplier that is added to or multiplies the EOI timing. In this way, the EOI timing is adjusted based on IVC and piston position at IVC. Method 400 proceeds to 412 after EOI is adjusted.

At 412, method 400 judges whether or not engine rotation is required to determine engine position. If engine position is known before engine cranking, the answer is no and method 400 proceeds to 416. Otherwise, the answer is yes and method 400 proceeds to 414.

At 414, method 400 begins rotating the engine via a starter motor or a motor that may provide torque to a vehicle's driveline. Engine position sensors provide signals from which engine position may be determined as the engine rotates. For example, engine position may be determined from crankshaft and camshaft position sensors. Method 400 proceeds to 416 after engine position is determined.

At 416, method 400 selects a first engine cylinder having an open intake valve where intake valve closing (IVC) is greater than a threshold number of crankshaft degrees after end of fuel injection (EOI). The threshold number of crankshaft degrees may be adjusted for the alcohol content in the fuel being injected and engine temperature. In one example, the threshold value is a base value that is a predetermined number of crankshaft degrees between EOI and IVC. Tables and/or functions are indexed using the alcohol concentration of fuel injected and engine temperature. The tables and or functions output adders or multipliers that are added to or multiplied by the base value to provide an adjusted threshold value. In one example, the threshold value is increased as the alcohol content of fuel injected increases so that a greater number of crankshaft degrees are between EOI and IVC. The threshold value is decreased as the alcohol content of the fuel injected decreases. The threshold value is decreased as the engine temperature increases. The threshold value increases as the engine temperature decreases.

In some examples, the threshold value may also be adjusted to account for barometric pressure, engine cranking speed, and ambient humidity. For example, if barometric pressure decreases, the threshold value may decrease since the injected fuel may evaporate more easily. If barometric pressure increases, the threshold value may increase since the injected fuel may not evaporate as easily. If engine cranking speed increases above a base cranking speed, the threshold value may increase since the faster engine cranking speed may provide less time for injected fuel to evaporate. If ambient humidity increases above a base humidity, the threshold value may increase since the injected fuel may not evaporate as easily.

In this way, additional time may be provide for fuel to evaporate from the cylinder port for the first fuel injection event since engine stop so that engine misfire may be avoided. Method 400 proceeds to 418 after the first cylinder to receive port injected fuel since engine stop is selected.

At 418, method 400 judges whether or not fuel is to be injected while the engine is rotating. In one example, the answer is yes and method 400 proceeds to 430 when engine position may not be established unless the engine is rotating. If engine position may be established before the engine rotates, the answer is no and method 400 proceeds to 420.

At 420, method 400 injects fuel to the port of the cylinder selected at 416. The fuel is injected by providing pressurized fuel to a fuel injector and opening the fuel injector via an electrical signal. Method 400 proceeds to 422 after the fuel is injected.

At 422, method 400 rotates the engine. The engine may be rotated via a starter or via a motor that may supply torque to propel the vehicle. Method 400 proceeds to 434 after the engine begins to rotate.

At 430, method 400 rotates the engine as described at 422. Method 400 proceeds to 432 after the engine begins to rotate.

At 432, method 400 injects fuel as described at 420. Method 400 proceeds to 434 after the engine begins to rotate.

At 434, method 400 judges whether or not alcohol content of the fuel being injected to the engine is greater than a threshold amount. If so, method 400 proceeds to 440. Otherwise, the answer is no and method 400 proceeds to 436.

At 436, method 400 injects fuel to each engine cylinder after fuel is injected to the first cylinder after engine stop. The fuel is injected to each cylinder sequentially according to the engine firing order and as shown in FIGS. 2 and 3. The fuel is injected to the cylinders when the intake valves of the cylinders receiving the fuel are closed (e.g., during the cylinder's exhaust stroke). In this way, fuel is injected to the engine to an open intake valve for a first combustion event and then subsequent fuel injections occur during closed intake valves. Method 400 proceeds to exit after sequential fuel injection is started.

At 440, method 400 injects fuel to all engine cylinders before an end of a first exhaust stroke of the first cylinder receiving fuel. In some examples, fuel is injected to all cylinders at the same time. By injecting fuel to all cylinders before an end of the first exhaust stroke of the first cylinder receiving fuel, it may be possible to improve fuel vaporization for the remaining engine cylinders. The fuel may be injected to all cylinders as the alcohol concentration of injected fuel increases so that alcohol fuels have more time to evaporate before being inducted to engine cylinders. After the simultaneous injection of fuel to all cylinders but for the first cylinder receiving fuel, fuel is sequentially injected to the cylinders. Method 400 proceeds to exit after fuel is injected to all cylinders.

Thus, the method of FIG. 4 provides for a method for starting an engine, comprising: selecting a cylinder of an engine to receive a first port injection of fuel to the engine since engine stop in response to an intake valve of the cylinder being open and a position of the engine allowing end of fuel injection to the cylinder a predetermined number of crankshaft degrees before intake valve closing of the cylinder. The method includes where the cylinder is selected when the engine is stopped, and where a fuel injection pulse width is increased as the position is closer to the intake valve closing of the cylinder. The method includes where the cylinder is selected when the engine is rotating. The method includes where the end of fuel injection is adjusted in response to an alcohol content of fuel being injected to the cylinder.

In some example, the method includes where the end of fuel injection is adjusted in response to an engine temperature. The method includes where the predetermined number of crankshaft degrees are adjusted in response to engine temperature. The method includes where the predetermined number of crankshaft degrees are adjusted in response to alcohol content of fuel being injected to the cylinder. The method also includes where the end of fuel injection is adjusted based on an intake valve closing time of the cylinder.

In another example, the method of FIG. 4 provides for a method for starting an engine, comprising: selecting a cylinder of an engine to receive a first port injection of fuel to the engine since engine stop in response to an intake valve of the cylinder being open and a stopping position of the engine being greater than a predetermined number of crankshaft degrees before intake valve closing of the cylinder; and injecting fuel to a different cylinder, the different cylinder receiving the first port injection of fuel to the engine since engine stop in response to the intake valve of the cylinder being open and the stopping position of the engine being less than the predetermined number of crankshaft degrees before intake valve closing of the cylinder.

In some examples, the method includes where injecting fuel to the different cylinder is during an open intake valve event of the different cylinder. The method also includes where the different cylinder is a first cylinder to have an open intake valve and a position to allow an end of fuel injection to the different cylinder a predetermined number of crankshaft degrees before intake valve closing of the different cylinder The method further comprises injecting a first fuel injection to each remaining engine cylinder before an end of an exhaust stroke of the cylinder in response to a content of alcohol of fuel injected to the engine being greater than a predetermined amount. The method further comprises injecting the first fuel injection to each of the remaining engine cylinders sequentially in an order of combustion of the engine in response to the content of alcohol of the fuel injected to the engine being less than the predetermined amount. The method includes where the predetermined number of crankshaft degrees before intake valve closing is adjusted in response to barometric pressure.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, full electric or partially electric driven powertrains could use the present description to advantage. Further, the system and methods described herein may be used to advantage with various engine configurations not limited to 14, V6, V8, V10, V12, and 16 engine configurations.

The invention claimed is:

1. An engine system, comprising:

an engine including a cylinder;

a port fuel injector positioned to supply fuel to the cylinder; and a controller including non-transitory instructions for selecting a cylinder for a first combustion event in the cylinder since engine stop in response to an end of fuel injection timing and an intake valve closing time.

2. The engine system of claim 1, where the end of fuel injection timing is based on an alcohol content of fuel injected to the engine.

3. The engine system of claim 1, where the end of fuel injection timing is based on engine temperature.

4. The engine system of claim 1, where the instructions select the cylinder in further response to a number of crankshaft degrees between the end of fuel injection timing and the intake valve closing time being greater than a threshold number of crankshaft degrees.

5. The engine system of claim 4, further comprising additional instructions for adjusting the threshold number of crankshaft degrees in response to alcohol content of fuel being injected to the engine.

6. The engine system of claim 4, further comprising additional instructions for adjusting the threshold number of crankshaft degrees in response to engine temperature.

* * * * *